United States Patent [19]

Caceres

[11] Patent Number: 4,852,163

[45] Date of Patent: Jul. 25, 1989

[54] TELEPHONE MOUTHPIECE COVER

[76] Inventor: Carlos Caceres, 13112 Lubbock La., Austin, Tex. 78729

[21] Appl. No.: 81,462

[22] Filed: Aug. 3, 1987

[51] Int. Cl.$^4$ .............. H04M 1/17

[52] U.S. Cl. .............. 379/452; 379/451

[58] Field of Search .............. 379/452, 439, 437, 441, 379/447, 451

[56] References Cited

U.S. PATENT DOCUMENTS

| | | | |
|---|---|---|---|
| D. 214,322 | 6/1969 | Velasquez | 379/451 |
| 970,015 | 9/1910 | Cann | 379/452 |
| 1,168,284 | 1/1916 | Claussen | 379/452 |
| 1,493,557 | 5/1924 | Meadoff | 379/452 |
| 2,607,862 | 8/1952 | Panken | 379/452 |
| 2,741,666 | 4/1956 | Lutz | 379/452 |
| 2,938,967 | 5/1960 | Guardino | 379/452 |
| 3,148,249 | 9/1964 | King | 379/452 |
| 3,238,313 | 3/1966 | Kalogris | 379/452 |
| 3,243,527 | 3/1966 | Sternheim | 379/452 |
| 3,643,040 | 2/1972 | Kaneyasu | 379/452 |
| 4,486,628 | 12/1984 | Thompson | 379/452 |
| 4,570,038 | 2/1986 | Tirelli | 379/452 |

FOREIGN PATENT DOCUMENTS

| | | | |
|---|---|---|---|
| 496167 | 4/1930 | Fed. Rep. of Germany | 379/452 |
| 221794 | 2/1925 | United Kingdom . | |
| 291237 | 5/1928 | United Kingdom | 379/452 |
| 425595 | 6/1933 | United Kingdom | 379/439 |

*Primary Examiner*—Jin F. Ng
*Assistant Examiner*—Danita R. Byrd
*Attorney, Agent, or Firm*—David G. Henry

[57] ABSTRACT

A cover for a telephone mouthpiece or earpiece. A single piece of frustocircular paperboard is forced into a cylindrical cavity whereby a cover is formed having a cap portion and a skirt portion. The diameter of the cap is about fifty-six millimeters so as to fit snugly on standard telephone receivers. The skirt portion is flared, has a cutout to accommodate the handle of the telephone receiver, and has a plurality of annular ribs for reinforcement. The cover is one integral unit, designed to be completely disposable, and simple to manufacture.

2 Claims, 2 Drawing Sheets

TELEPHONE MOUTHPIECE COVER

BACKGROUND OF THE INVENTION

1. Field of the Invention

The present invention relates to paper-like articles used to cover items, and more particularly to a cover designed to fit over and around a telephone mouthpiece or earpiece for minimizing transmission of diseases.

2. Description of the Prior Art

Studies have shown that most telephones, or more correctly, the mouthpieces and earpieces thereof, accumulate a tremendous amount of germs ranging from the streptococcus bacteria to the herpes virus. This is primarily caused by direct contact with the mouth or ear of a carrier of the germ. With the growing concern in this country over transmission of infectious diseases, it is surprising that most individuals do not take some precautionary measures in reducing the health risks associated with telephones, particularly public telephones, which are typically located in commercial establishments and are used by a large number of persons who are total strangers to one another.

Several attempts have been made to provide a means for disinfecting or otherwise eliminating the germs on telephone instruments. For example, U.S. Pat. No. 2,741,666 issued to M. Lutz on Apr. 10, 1956, discloses an attachment for a telephone mouthpiece made up of two rings. A first ring contains a number of compartments into which antiseptics, germicides, or other substances can be placed. A second ring acts as a cap over the first ring and secures them both to the telephone mouthpiece. Channels through the first ring allow the germicide or other substance to pass over the mouthpiece. Another device, described in U.S. Pat. No. 2,938,967 issued to R. Guardino on May 31, 1960, provides a replaceable germicidal disk or filter which is locked within a cap which in turn clamps over the telephone mouthpiece. Other very similar devices are shown in U.S. Pat. No. 3,148,249 issued to J. King on Sep. 8, 1964 (sponge-like disk and cap with "arms"), and U.S. Pat. No. 3,243,527 issued to H. Sternheim on Mar. 29, 1966 (lip with beads on lower edge of cap).

More complicated implements have been employed for this same purpose. In U.S. Pat. No. 3,238,313 issued to T. Kalogris on Mar. 1, 1966, a composite mouthpiece utilizes a filter, inner and outer rings, an antiseptic disk and a cap designed to slide over existing mouthpieces. In order to replace the filter, the cap must be removed, the inner and outer rings separated, and the antiseptic disk withdrawn from two surrounding disks. The use of germicidals in these devices has been further refined in U.S. Pat. No. 3,643,040 issued to M. Kaneyasu on Feb. 15, 1972. Kaneyasu has taken certain volatile medicinal fluids and combined them with microcrystalline cellulose and corn starch to form flat discs or tablets. The disinfectant sublimates or vaporizes each time the phone is used due to air circulation. Finally, U.S. Pat. No. 4,486,628 issued to V. Thompson on Dec. 4, 1984, depicts a unique invention in which an ultraviolet radiation emitter is placed between the diaphragm and the cover of the mouthpiece. This electromagnetic radiator emits a frequency that will destroy bacteria and the like. Obviously, great care must be taken to insure that the device does not malfunction.

Each of the above-described inventions suffer from several serious drawbacks. First of all, although some portions of the devices may be throwaway parts or otherwise replaceable, the total unit is not designed to be disposable, requiring some amount of manipulation of the components in order to change out the depleted parts. Furthermore, most of these devices are intended to be used at a fixed station, i.e., on only one particular phone, most likely at the user's home. Finally, the production of these units is prohibitively expensive, since the multiplicity of parts involved requires excess manufacturing costs. It would, therefore, be desirable and advantageous to devise a telephone mouthpiece cover which is totally disposable, comes in one integral unit, and yet is cheap to manufacture, and further may be easily used on telephones at any location.

SUMMARY OF THE INVENTION

Accordingly, the primary object of the present invention is to provide a telephone mouthpiece cover for minimizing transmission of disease from telephones.

Another object of the invention is to provide such a cover which is easy to use, and totally disposable.

Still another object of the invention is to provide such a cover having improved structural characteristics.

Yet another object of the invention is to provide a telephone mouthpiece cover which may be easily and inexpensively manufactured.

A further object of the invention is to provide such a cover which reduces the transmission of undesirable background noise across the telephone lines.

The foregoing objects are achieved in a telephone mouthpiece cover constructed of a single piece of paperboard, having a flared skirt with annular reinforcing ribs, manufactured with a simple die and tool setup.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of illustrative embodiments when read in conjunction with the accompanying drawings, wherein:

DESCRIPTION OF THE PREFERRED EMBODIMENTS

Figure 1:
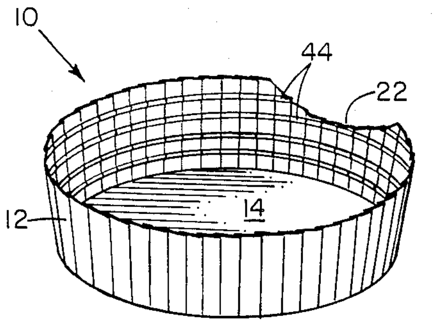
FIG. 1 is an underside perspective view of the telephone mouth cover of the present invention.

With reference now to the figures, and in particular with reference to FIG. 1, there is depicted the telephone mouthpiece cover 10 of the present invention. Cover 10 is formed from a single piece of paperboard, preferably virgin white stock, and at least eight mils thick. Thinner paperboard does not provide the rigidity required for stiff attachment of cover 10 to mouthpiece 16. Actually, the inventor has found that a thickness of nine mils is preferable for the uses herein described.

Solid bleach sulfate stock as approved by the Food and Drug Administration is satisfactory. Cover 10 is essentially cylindrical in shape, having a flared skirt 12 and a cap 14.

Figure 2:
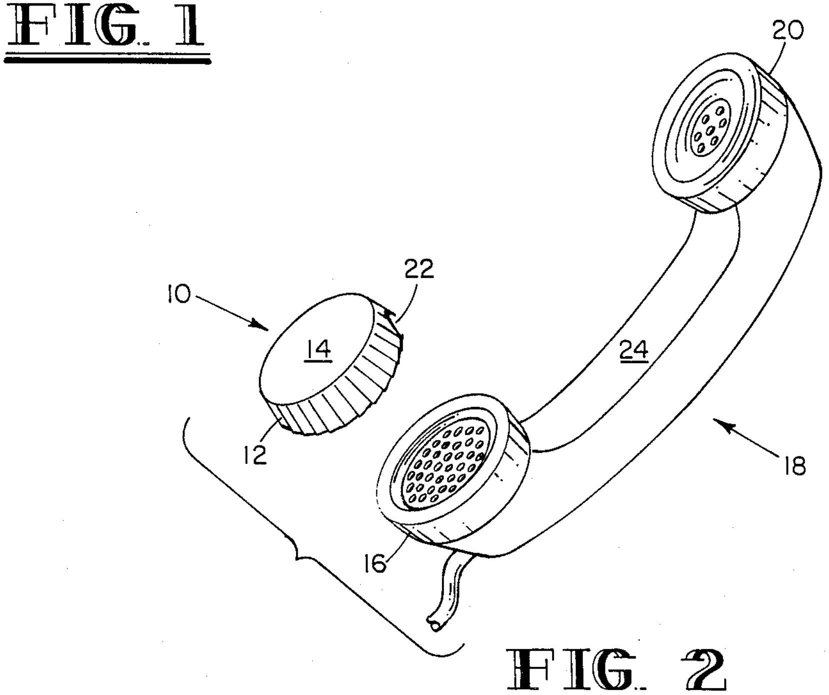
FIG. 2 is a perspective showing the present invention in relation to a standard telephone handset.
Figure 3:
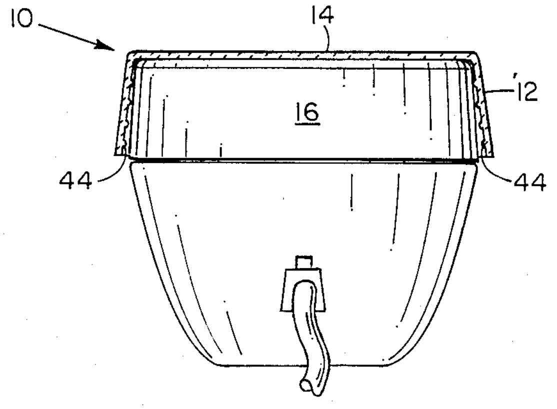
FIG. 3 is a side view showing the cover of the present invention nestled over the telephone mouthpiece.

As further shown in FIGS. 2 and 3, cover 10 is intended to be used on the mouthpiece 16 of a standard telephone handset 18. Of course, it may just as effectively be placed on the earpiece 20. Cover 10 is provided with a cutout 22 which is designed to accommodate the handle portion 24 of telephone 18.

In contrast with the prior art discussed above in the Background of the Invention, cover 10 presents not just a filter between the user and telephone mouthpiece 16, but rather presents a total physical barrier therebetween. Such a barrier is clearly superior to filters for the purpose of minimizing transmission of bacteria, viruses, etc. Although one might think that this would inhibit proper voice transmission along the telephone lines, no difference in transmission quality has been found which is perceptible to the human ear. The inventor has found, however, that the use of such a paperboard barrier provides the unexpected advantage of filtering out excess noise occurring in the background during a conversation.

The true novelty of the invention lies in its ease of manufacture and use. As pointed out above, all of the prior art items are intended to be used numerous times, certain elements (filters, antiseptic tablets) being replaced after each use. The necessity of replacing certain elements while retaining others not only makes the prior art devices difficult to use, but also adds to production costs. The present invention is directed to a telephone mouthpiece cover which is completely disposable, and it is anticipated that each device will be thrown away after a single use.

Figure 4:
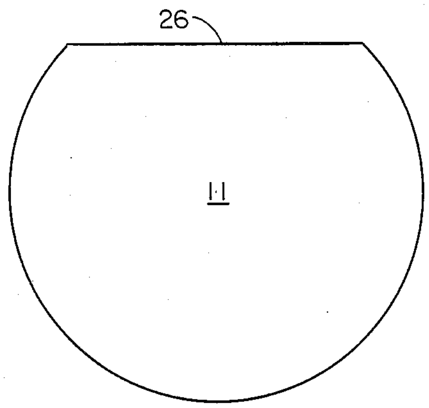
FIG. 4 is a top plan view showing the cut pattern of the unmolded paperboard which forms the invention.
Figure 5:
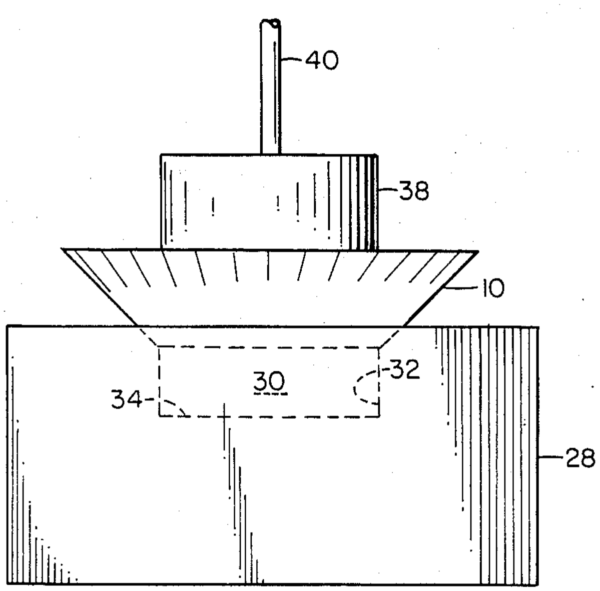
FIG. 5 is a side view showing a simple tool and die setup for molding the paperboard into the telephone mouthpiece cover.
Figure 6:
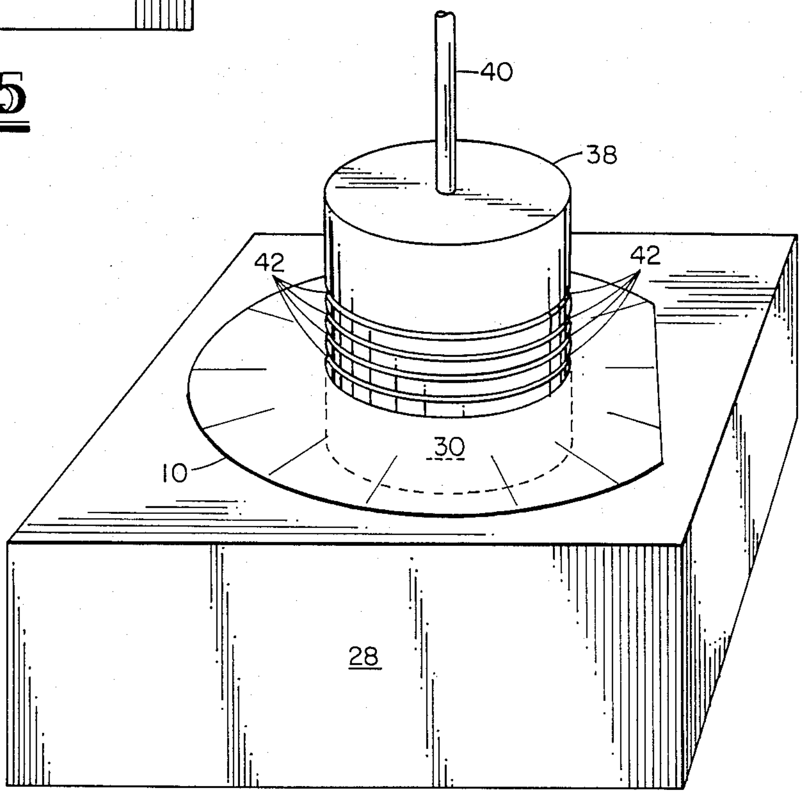
FIG. 6 is a perspective view showing the tool and die of FIG. 5 and more clearly showing the rib pattern thereof.

With further reference now to FIGS. 4, 5 and 6, it is seen that the cover 10 may be manufactured with a simple die and tool operation. First, a flat piece of paperboard 11 is cut in a circular fashion with one portion cut off forming a straight edge 26. This shape is known as frusto-circular. In order to provide a cap diameter of at least 56 millimeters, edge 26 should be at least 28 millimeters from the center of frusto-circular paperboard 11 at its closest point. The diameter of the cut paperboard 11 is approximately 110 millimeters, and edge 26 has a length of about 60 millimeters. Paperboard 11 is then placed on top of a mold 28 having a cylindrical cavity 30 therein. As previously mentioned, the skirt 12 of cover 10 should have a flared shape, so that cover 10 may accommodate varying sizes of mouthpieces 16, and yet still properly grip the mouthpiece. Because of this, cavity 30 is bounded by an annular wall 32 which forms an obtuse angle with the floor 34 of cavity 30, thus producing the flared skirt 12. Also, skirt 12, and hence wall 32, preferably have a height of about 25 millimeters, which facilitates dispensation of the covers from a tubular type dispenser.

A die tool 38 is disposed above mold 28 by any suitable means, such as an actuation shaft 40. Die tool 38 is also cylindrical in shape, and its diameter is equal to the inner diameter of floor 34 of cavity 30. The inventor has found that a diameter of about 56 millimeters is preferable for use of the cover on standard phones, such as those manufactured by American Telephone & Telegraph. Of course, the size of the cover may vary according to the size of the mouthpiece involved. Moreover, square covers may be manufactured in accordance with this invention which fit onto square-shaped telephone mouthpieces. Die tool 38 has the additional feature of a plurality of annular indented rings 42, whereby, as cover 10 is forced into cavity 30, the compressive forces involved create a plurality of ribs 44 along the inside of skirt 12. Eight such rings 42 are envisioned as being optimum for the preferred height of skirt 12. Ribs 44 add structural integrity to skirt 12, providing extra resistance to destructive forces exerted on cover 10 as it is placed tightly about mouthpiece 16. Ribs 44 also facilitate attachment of cover 10 to mouthpiece 16 by providing a gripping action. When tool 38 has completed its downward motion into cavity 30, edge 26, which was straight, has now become curved, so as to better accommodate handle 24 of telephone 18. The upward movement of tool 38 draws cover 10 out of cavity 30, and the cover is then ready for packaging and shipment. While a simplified tool and mold set has been presented for manufacture of cover 10, more complicated assemblies may be used as those skilled in the art can appreciate; for instance, steam or heat may be applied to cover 10 as it is pressed into cavity 30 so as to provide further rigidity thereto. Cap 14 of cover 10 is preferably imbued with antiseptics or deodorizing agents as taught in the prior art.

Although the invention has been described with reference to specific embodiments, this description is not meant to be construed in a limiting sense. Various modifications of the disclosed embodiment, as well as alternative embodiments of the invention will become apparent to persons skilled in the art upon reference to the description of the invention. It is therefore contemplated that the appended claims will cover such modifications that fall within the true scope of the invention.

I claim:

1. A cover for a telephone mouthpiece comprising:

an integral paperboard formed into a central cap portion and a skirt portion;

said paper board being at least eight mils thick;

said cap portion being essentially circular and having a diameter of about fifty-six millimeters; to enable conformance with a telephone mouthpiece;

said skirt portion having an essentially cylindrical shape attached to said cap portion around the periphery of said cap portion, said skirt portion being slightly flared and said skirt portion having a height of about twenty-six millimeters, said skirt portion further having a cutout for accommodating a handle attached to said telephone mouthpiece; and a plurality of annular parallel ribs in said skirt portion, said ribs providing rib reinforced structural stiffness to said skirt portion.

2. The telephone mouthpiece cover of claim 1 wherein eight annular parallel ribs are formed in said skirt portion, and said paperboard is white stock.

* * * * *